United States Patent [19]
McBride et al.

[11] 3,946,259
[45] Mar. 23, 1976

[54] ELECTRIC STEPPING MOTORS AND REMOTE REGISTERS

[75] Inventors: Maurice Graham McBride, Barnet; Bernard Herbert Leslie Gray, Enfield, both of England

[73] Assignee: Sangamo Weston Limited, Enfield, England

[22] Filed: Sept. 14, 1973

[21] Appl. No.: 397,273

[30] Foreign Application Priority Data
Sept. 18, 1972 United Kingdom............... 43216/72

[52] U.S. Cl.............................. 310/49 R; 318/138
[51] Int. Cl.²........................................ H02K 37/00
[58] Field of Search........ 310/49, 91, 162, 172, 163, 310/164, 156, 154, 261, 258, 264, 40 MM; 318/138

[56] References Cited
UNITED STATES PATENTS

| | | | |
|---|---|---|---|
| 3,391,289 | 7/1968 | Danilewicz | 310/49 |
| 3,470,509 | 9/1969 | Silverman | 310/49 |
| 3,546,673 | 12/1970 | Harden | 310/49 |
| 3,588,888 | 6/1971 | Harden | 310/49 |
| 3,626,263 | 12/1971 | McBride | 310/49 |
| 3,671,841 | 6/1972 | Hoffmann | 310/49 |
| 3,691,414 | 9/1972 | Kappius | 310/49 |
| 3,745,388 | 7/1973 | Frederick | 310/49 |
| 3,801,844 | 4/1974 | Steele | 310/49 |

*Primary Examiner*—R. Skudy
*Attorney, Agent, or Firm*—Young & Thompson

[57] ABSTRACT

A stepping motor for use in a remote register, such as is used for the remote reading of electricity meters, is arranged to be advanced by current pulses of known constant polarity. The motor includes magnetic biasing means which effect further rotation of the rotor of the stepping motor in the same given direction each time that an input current pulse ends. The motor can therefore be controlled by a simple ON/OFF switch in the electricity meter circuit with a rectifier being provided in the remote register. The magnetic biasing means may consist of one or more cylindrical magnets co-axial with the rotor, or a straight or arcuate bar magnet adjacent to the periphery of the rotor.

8 Claims, 6 Drawing Figures

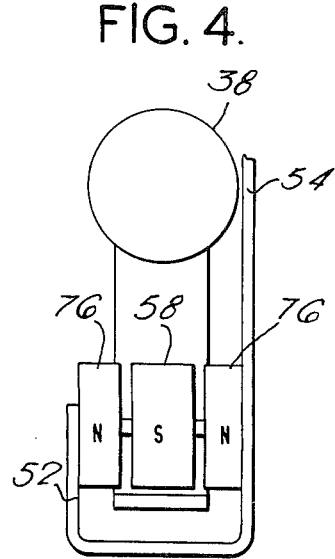
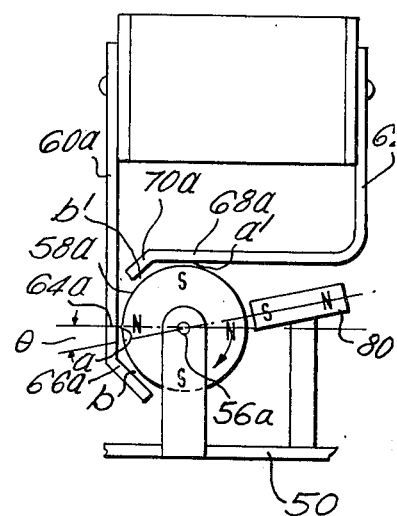
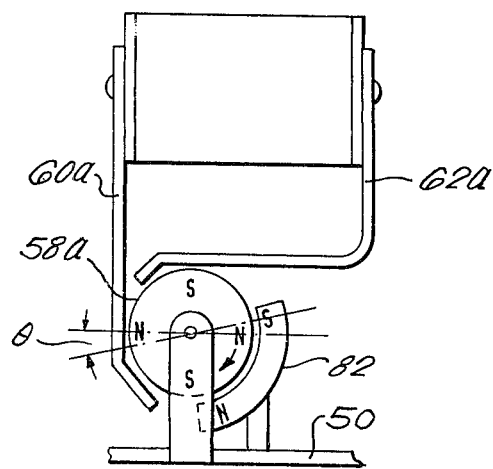

ELECTRIC STEPPING MOTORS AND REMOTE REGISTERS

FIELD OF THE INVENTION

This invention relates to electric stepping motors, and is more particularly concerned with stepping motors suitable for operating registers which are positioned remote from integrating metering means, e.g. electric kilowatt-hour meters. The invention is also concerned with remote register devices and systems incorporating such stepping motors, and particularly those adapted for use as external meter registers for indicating the register reading of electric kilowatt-hour and other utility supply meters within buildings, particularly domestic premises.

DESCRIPTION OF THE PRIOR ART

U.S. Pat. No. 3,626,263 describes a remote register fitted with a d.c. stepping motor which is controlled from a single-pole changeover switch in the integrating meter circuitry, so that current pulses of alternate opposite polarity are arranged to energise the stepping motor coil each time that the changeover switch makes or breaks contact. Thus, the polarity of the current through the stepping motor coil changes for each movement of the changeover switch, and each such polarity change (occurring every kilowatt-hour registered by the integrating meter for example) advances the stepping motor rotor by one half revolution. A reduction gear is provided between the stepping motor and a recording drum of the remote register device so that each change of polarity advances the recording drum by 1/10th of a revolution.

This prior arrangement requires the provision of rectifier means in the circuitry of the integrating meter in order to provide the current pulses of alternately opposite polarity for the remote register. Also in this prior arrangement, it is necessary to ensure that each movement step of the rotor consists of movement through a full 180° arc.

SUMMARY OF THE INVENTION

It is an object of the present invention to provide an alternative arrangement which avoids the need for the generation of pulses of opposite polarity, the stepping motor being arranged to be advanced by pulses of constant known polarity controlled by an ON-OFF switch in the circuit of the integrating meter. The present invention also avoids the need to provide rectifier means in the integrating meter circuitry as the remote register device is triggered by a.c. pulses from the integrating meter. This means that if a remote register device is being connected to an existing integrating meter in domestic premises for example, the only change which has to be made to the integrating meter circuitry is the inclusion of an ON/OFF switch, as all other necessary circuitry can be built into the remote register device which is being installed.

It is a further object of the present invention to provide a stepping motor capable of effecting reliable operation of a register device, particularly one of the so-called cyclometer type, which comprises a plurality of co-axial drums provided with digital characters around their respective peripheries and adapted to be advanced stepwise one from another in the conventional way.

In accordance with the present invention there is provided a stepping motor comprising a permanently magnetised rotor having peripheral magnetic poles, means mounting said rotor for rotation about an axis of rotation, a stationary magnetic circuit comprising a pair of stator pole members each having at least one polar surface positioned adjacent to the periphery of the rotor, an electromagnet winding associated with a part of the magnetic circuit to produce, when energised, opposite magnetic polarities in the respective stator pole members, and magnetic biasing means fixedly mounted adjacent to said rotor, the magnetic flux in the magnetic circuit and through the rotor by way of the polar surfaces being such as to produce an output rotary movement of said rotor through a predetermined angle in a given direction in response to an input energising current to said winding, and the magnetic flux due to said biasing means being such as to produce a rotary movement of the rotor through a second predetermined angle in the same direction in response to de-energisation of said winding.

Preferably, the poles of said magnetic biasing means are angularly offset relative to the poles of the rotor when said winding is de-energised to ensure rotation of the rotor in said given direction.

According to another aspect of the invention a register device for providing a numerical visual indication in response to input electrical signals comprises a rotatable input member arranged to be rotated in stepwise movements, a stepping motor in accordance with the invention, a reduction gear train connecting the rotor of the stepping motor to said input member, and rectifier means arranged to receive a.c. signals and connected to said motor winding to feed current pulses of constant polarity thereto.

BRIEF DESCRIPTION OF THE DRAWINGS

A number of embodiments in accordance with the invention will now be described by way of example and with reference to the accompanying drawings, in which:

FIG. 4 is a front elevation of the stepping motor of FIGS. 2 and 3;

FIG. 5 is a side elevation of a modified form of stepping motor in accordance with the invention having the rotor poles 90° apart; and, FIG. 6 is a side elevation of a further modified form of stepping motor in accordance with the invention, again with the rotor poles 90° apart.

DESCRIPTION OF THE PREFERRED EMBODIMENTS

The illustrated embodiments of an electric stepping motor are all particularly adapted for operating a remote register device suitable for location in a readily accessible and visible position, e.g. outside a building, while being operated from an integrating meter device, such as an electric kilowatt-hour meter, located in a normally inaccessible position, e.g. within the building, and electrically connected thereto by a pair of electric conductors.

Figure 1:
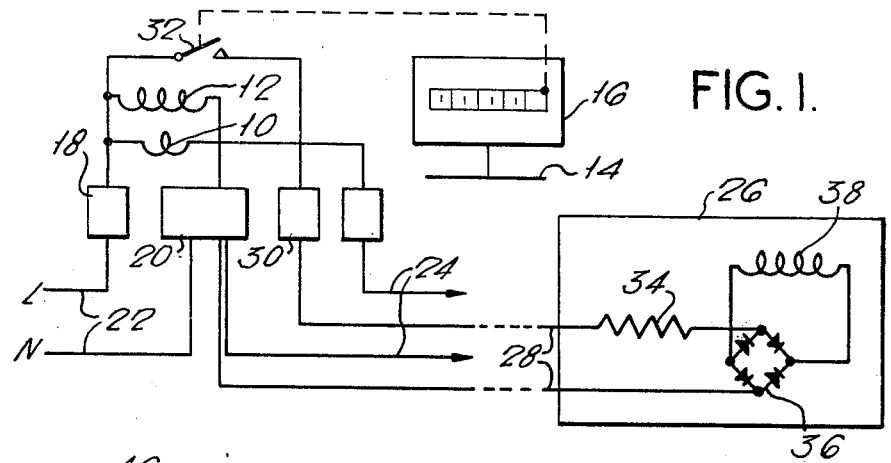
FIG. 1 is a circuit diagram illustrating the connection of a remote register in accordance with the invention to an electric supply meter.

Referring first to FIG. 1, this illustrates the connection of the remote register device to the integrating meter device, and how the remote register device is arranged to be advanced by current pulses of constant polarity. In FIG. 1 the integrating meter device is shown schematically as a conventional kilowatt-hour meter having a current coil 10, a voltage coil 12, and a rotor spindle 14 operating a register mechanism 16 through the usual form of reduction gearing. The current coil 10 and the voltage coil 12 are connected across the respective input line and neutral terminals 18, 20 which are connected to the mains power supply over leads 22. The metered load is connected across leads 24 while the remote register device 26 is connected by a pair of conductors 28 across terminals 20 and 30. An ON/OFF switch 32 is connected into the circuit between terminals 18 and 30 and is arranged to be driven by the meter register 16 in such a manner that it makes one complete on-off movement for each kilowatt-hour recorded by the register 16. For example, the integrating register mechanism 16 may include a cam which is operative upon the switch 32 at the instant of completion of consumption of each kilowatt-hour unit.

The remote register 26 incorporates a resistor 34 and a bridge rectifier 36 connected across leads 28. Thus, when the switch 32 is "on" an a.c. pulse is passed over leads 28 to the remote register 26 where it is rectified to produce a low voltage d.c. current pulse of known constant polarity at the output side of the rectifier 36. This d.c. current is applied to the coil 38 of a stepping motor incorporated in the remote register. Thus, with repeated on-off actuation of the switch 32, each time the switch is made a d.c. current of constant polarity is applied to the coil 38 of the stepping motor under the control of the switch 32 and hence of the integrating register 16.

Figure 2:
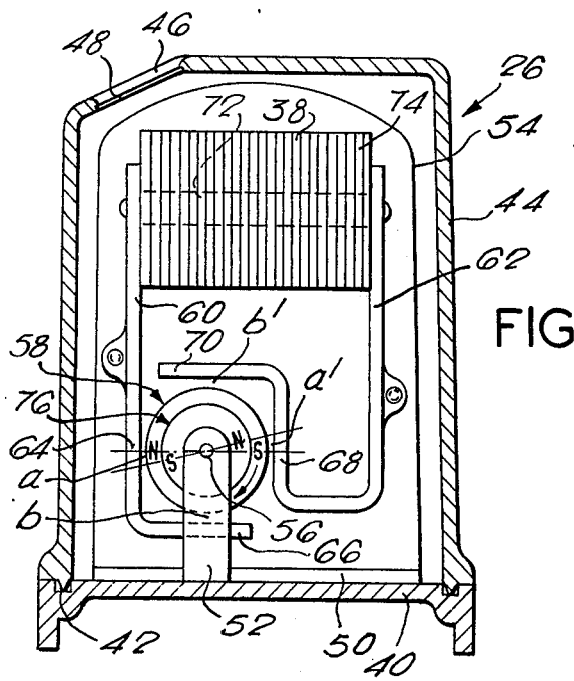
FIG. 2 is a side elevational view, partly in section, of a remote register incorporating a stepping motor in accordance with the present invention, with the motor coil de-energized.
Figure 3:
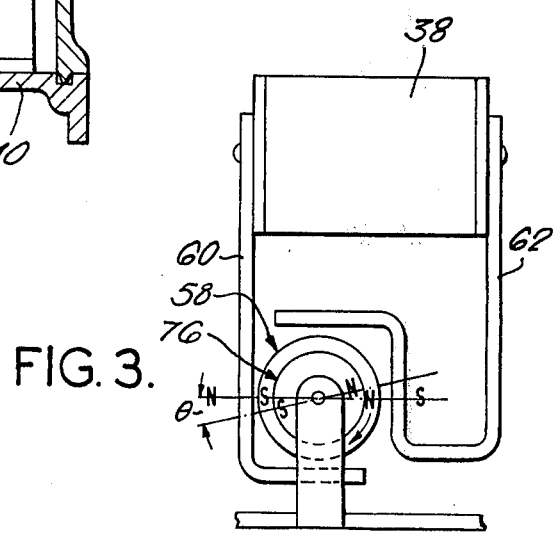
FIG. 3 is a view of the stepping motor of FIG. 2 but with the motor coil energised.

FIGS. 2, 3 and 4 show a first embodiment of stepping motor in accordance with the invention, and FIG. 2 shows a part of the remote register 26 within which the stepping motor is mounted. For a more detailed description of the remote register 26 reference should be made to U.S. Pat. No. 3,626,263. The register device 26 comprises a base plate 40. A recess or groove 42 in the upper surface of the base plate is adapted to receive therein the marginal edge of a hollow box-like cover 44. Part of the upper region of the cover 44 is set at an angle and has a viewing aperture 46 therein which is closed by a glass window 48.

As is described in the aforementioned U.S. Pat. No. 3,626,263 the cover 44 encloses a number of cyclometer number drums each carrying digit indications 0, 1, 2 . . . 9 around their peripheries. These drums (not shown) are arranged to be driven one from another so that at the end of each revolution of one drum the drum of next higher digital significance is stepped onwards by an angle of 36° to alter by one unit the digit value exposed to view through the window 48.

The base plate 40 carries an approximately U-shaped frame plate 50 having upstanding bearing support limbs 52 and 54. The shaft 56 of the stepping motor is rotatably mounted in the limbs 52 and 54 of the frame plate 50 and carries a pinion (not shown) which is in mesh with a spur gearwheel (not shown) integral with the first or lowest significant digit drum of the cyclometer train. The shaft 56 carries a rotor 58 of suitable permanently magnetized material. The rotor 58 is permanently magnetized in a diametral direction to provide a signal north-seeking pole N on one side of the cylindrical periphery and a complementary south-seeking pole S on the diametrically opposite side of its periphery.

The rotor 58 operates between pole members forming part of a stationary magnetic flux circuit. In the embodiment of FIGS. 2 to 4, this magnetic flux circuit comprises a first pole member 60 formed of a rectangular cross-section strip of ferromagnetic material, e.g. mild steel, and a second pole member 62 of a similar rectangular cross-section strip of ferromagnetic material. The first pole member 60 is positioned so as to provide a main pole 64 having a flat main polar surface facing but separated from the opposing peripheral surface of the rotor 58 by a first main pole magnetic flux gap $a$. This pole member 60 is bent at right-angles towards one end so as also to provide a subsidiary pole 66 which has a flat subsidiary polar surface likewise facing but separated from the opposing peripheral surface of the rotor 58 by a first subsidiary pole flux gap $b$. The second pole member 62 is bent three times at right-angles so as to provide a second main pole 68 also having a flat main polar surface which is parallel with the first main polar surface and is separated from the facing peripheral surface of the rotor 58 by a second main pole flux gap $a'$ disposed at a position diametrically opposite the first main pole flux gap $a$, and a subsidiary pole 70 having a flat subsidiary polar surface which is separated from the rotor surface by a second subsidiary pole flux gap $b'$ which is diametrically opposite the gap $b$.

The opposite end of the first pole member 60 is secured in good magnetic transfer relationship to one end of a cylindrical core 72 of ferromagnetic material. The opposite end of the core 72 has secured thereto in good magnetic transfer relationship the other end of the second pole member 62. A bobbin 74 of electrically insulating material carrying an electromagnetic winding 38 is provided around the core 72.

As shown most clearly in FIG. 4, biasing magnets 76 of cylindrical form are mounted fixedly one on each side of the rotor 58 and are secured to the limbs 52 and 54 of the frame plate 50 respectively. The biasing magnets 76 are of substantially the same diameter as the rotor 58, but in FIGS. 2 and 3 they are shown reduced in diameter for ease of illustration. The magnets 76 are permanently magnetized in a diametral direction to provide a single north-seeking pole on one side of their periphery and a complementary south-seeking pole on the diametrically opposite side of their periphery.

In the operation of this arrangement, the current pulses applied to the stepping motor of the remote register 26 are derived from the switch 32 which is operated by the integrating register mechanism 16 of the driving meter. The switch 32 is driven by the register 16 and makes one complete on and "off" operation for each kilowatt-hour (or other unit) registered. With the switch 32 in the off position, the biasing magnets 76 hold the magnetized rotor 58 in the position shown in FIG. 2 with the poles of the rotor attracted to and facing the main poles 64 and 68 across the two main flux gaps $a$ and $a'$. When the switch 32 makes, the stepping motor coil 38 is energised (FIG. 3), and a current of opposite polarity to the biasing magnets and of sufficient magnitude to cancel the effect of these magnets and drive the rotor through one half turn is passed through the coil 38. The stator main poles 64 and 68 are thereby magnetized in the opposite sense to the biasing magnets, and assume a magnetic polarity similar to that of the facing polar regions of the rotor 58. The resultant magnetic repulsion causes the rotor 58 to turn through 180° to a position where the immediately facing rotor and main stator poles are of unlike polarity as shown in FIG. 3. The rotation is always in one direction which is determined by the positioning of the subsidiary poles 66 and 70 and the respective subsidiary pole flux gaps $b$ and $b'$, the direction of rotation being such that each rotor pole moves towards the subsidiary gap which is of unlike polarity. Thus in the case of the sample shown, the rotor 58 will always rotate in a clockwise direction as viewed in FIGS. 2 and 3.

When subsequently the switch 32 breaks and goes to the off position, the stator poles are de-energized. The biasing magnets 76 then cause the rotor 58 to rotate through a further 180° to a position shown in FIG. 2. The magnets 76 must be such that they provide sufficient flux force to drive the rotor through 180° but must also be such that when a current is passed through the coil 38 the flux force from the biasing magnets is not such as to prevent the rotation of the rotor from the position shown in FIG. 2 to the position shown in FIG. 3. In order to ensure that the magnetized rotor 58 rotates in the clockwise sense under the influence of the biasing magnets 76 when the winding 38 is de-energized, the biasing magnets are fixed to the frame plate limbs 52 and 54 in a position where the poles of the magnets 76 lag those of the rotor by a small angle $\theta$.

Thus, the rotor of thestepping motor will advance through one complete revolution for each on-off movement of the switch 32. Thus, with a stepping motor as described above used in conjunction wih a cyclometer type register providing decimal digit indications on each drum, a 10:1 gear reduction ratio must be provided between the rotor shaft 56 and the first drum of the cyclometer train. Thus, with this transmission ratio each 360° movement of the rotor 58 causes a 36° movement of the first cyclometer drum.

Various alternative forms of magnetic biasing may be employed as compared with that shown in FIGS. 2 to 4. For example, by axially displacing the stepping motor rotor 58 a single relatively thick biasing magnet 76 could be used at one side of the rotor instead of the two relatively thin cylindrical magnets one one each side of the rotor. Moreover, it is not necessary that the biasing magnet or magnets 76 be the same diameter as the rotor 58, although it is considered preferable to make them of substantially the same diameter.

FIG. 5 shows a further alternative magnetic biasing arrangement. In this embodiment the rotor 58 is magnetized to have 4 poles which are 90° apart, i.e. two diametrically opposed north poles and two diametrically opposed south poles. With this arrangement the stator pole member 60a is bent at 45° instead of 90°, so that the subsidiary pole 66b and the subsidiary pole flux gap $b$ are only displaced by 45° from the main pole 64 and main pole flux gap $a$. The other stator pole member 62a is similarly modified by being bent once at 90° and once at 45° in order to provide a main pole 68a and main pole flux gap $a'$ displaced by 90° relative to the main pole flux gap $a$ and also a subsidiary pole 70a and subsidiary pole flux gap $b'$ displaced by 45° from the main pole flux gap $a'$.

Instead of providing one or more cylindrical biasing magnets a straight bar magnet 80 is positioned with its one end adjacent to the periphery of the rotor 58a substantially diametrically opposite the main flux gap a but offset by an angle $\theta$, again to ensure that the rotor rotates in the correct direction under the influence of the biasing magnet 80. As will be apparent from this arrangement, each complete on and off movement of the switch 32 will cause the rotor 58a to rotate through 180° so that a 5:1 gear reduction ratio must be provided between the rotor shaft 56 and the first cyclometer drum.

FIG. 6 shows an arrangement similar to that in FIG. 5 but instead of using a straight bar magnet 80 an arcuate magnet 82 is provided extending through 90° and centred on the axis of the rotor shaft 56a. Again, as in the preceding embodiments, the arcuate magnet 82 is slightly offset relative to the poles of the rotor in order to ensure the correct direction of rotation of the rotor under the influence of the magnet 82.

Furthermore, although in the embodiments described above the stepping motors each having two subsidiary stator poles in the stationary magnetic circuit it is possible to dispense with one of these subsidiary poles as described for example in U.S. Pat. No. 3,626,263.

We claim:

1. An electric stepping motor comprising a permanently magnetised rotor having peripheral magnetic poles, means mounting said rotor for rotation about an axis of rotation, a stationary magnetic circuit comprising a pair of stator pole members each having at least one polar surface positioned adjacent to the periphery of the rotor, an electromagnet winding associated with a part of the magnetic circuit to produce, when energised, opposite magnetic polarities in the respective stator pole members, and stationary magnetic biasing means fixedly mounted on frame means adjacent to said rotor, the magnetic flux in the magnetic circuit and through the rotor by way of the polar surfaces being sufficient as to produce and output rotary movement of said rotor through a first predetermined angle in a given direction in response to an input energizing current to said winding, and the magnetic flux due to said biasing means being sufficient as to produce a rotary movement of the rotor through a second predetermined angle in the same direction as the first-mentioned direction in response to de-energisation of said winding but being insufficient to prevent the rotation of the rotor through said first predetermined angle when said winding is energized.

2. An electric stepping motor according to claim 1, in which said magnetic biasing means comprises at least one cylindrical magnet mounted on said frame means co-axially with respect to said axis of rotation and magnetised to provide a north-seeking pole at one region of its periphery and a complementary south-seeking pole at a diametrically opposite region of its periphery.

3. An electric stepping motor according to claim 1, in which said magnetic biasing means comprises a linear bar magnet having one end adjacent to the periphery of said rotor and having its longitudinal axis perpendicular to and passing through said axis of rotation of the rotor.

4. An electric stepping motor according to claim 1, in which said magnetic biasing means comprises an arcuate bar magnet positioned adjacent to the periphery of a portion of said rotor and concentric with respect to said axis of rotation, the angle subtended by said magnet at the centre of the rotor being equal to the angular spacing between two rotor poles of opposite polarity.

5. An electric stepping motor according to claim 1, in which said rotor comprises a cylindrical magnet magnetised diametrically to provide a single north-seeking pole at one peripheral region and a single complementary south-seeking pole at a diametrically opposite peripheral region, and in which said stationary magnetic circuit comprises a pair of main stator poles each having a flat main polar surface, which main polar surfaces are parallel to each other on diametrically opposite sides of the periphery of the rotor magnet, and at least one subsidiary stator pole having a flat subsidiary polar surface lying at an angle of 90° to said main polar surfaces and adjacent to the periphery of the rotor magnet, energisation of said winding producing opposite magnetic polarities in said main stator poles and the same magnetic polarity in said subsidiary stator pole as in a given one of said main stator poles.

6. An electric stepping motor according to claim 3, in which said rotor comprises a cylindrical magnet magnetised to provide two diametrically opposed north-seeking poles and two diametrically opposed south-seeking poles with adjacent poles spaced 90° apart, and in which said stationary magnetic circuit comprises a first strip of ferromagnetic material bent at 45° towards one end to form a first main stator pole and a first subsidiary stator pole at 45° to the main pole and connected towards its other end to one end of a magnetic core of said winding, and a second strip of ferromagnetic material bent at right-angles near its mid-region and bent again towards one end at 45° to form a second main stator pole and a second subsidiary stator pole at 45° to the main pole, the other end of said second strip being connected to the other end of said magnetic core of the winding.

7. An electric stepping motor according to claim 4, in which said rotor comprises a cylindrical magnet magnetised to provide two diametrically opposed north-seeking poles and two diametrically opposed south-seeking poles with adjacent poles spaced 90° apart, and in which said stationary magnetic circuit comprises a first strip of ferromagnetic material bent at 45° towards one end to form a first main stator pole
  and a first subsidiary stator pole at 45° to the main stator pole and connected towards its other end to one end of a magnetic core of said winding, and a second strip of ferromagnetic material bent at right-angles near its mid-region and bent again towards one end at 45° to form a second main stator pole and a second subsidiary stator pole at 45° to the main pole, the other end of said second strip being connected to the other end of said magnetic core of the winding.

8. An electric stepping motor according to claim 1, in which the poles of said magnetic biasing means are angularly offset relative to the poles of the rotor when said winding is de-energised to ensure rotation of the rotor in said given direction.

* * * * *